US008119284B2

(12) United States Patent
Ito et al.

(10) Patent No.: US 8,119,284 B2

(45) Date of Patent: Feb. 21, 2012

(54) NICKEL-METAL HYDRIDE BATTERY

(75) Inventors: Shinichiro Ito, Kosai (JP); Hiroyuki Sakamoto, Toyohashi (JP)

(73) Assignee: Panasonic EV Energy Co., Ltd., Kosai-Shi, Shizuoka (JP)

( * ) Notice: Subject to any disclaimer, the term of this patent is extended or adjusted under 35 U.S.C. 154(b) by 1090 days.

(21) Appl. No.: 11/964,620

(22) Filed: Dec. 26, 2007

(65) Prior Publication Data

US 2008/0160408 A1 Jul. 3, 2008

(30) Foreign Application Priority Data

Dec. 27, 2006 (JP) ................................ 2006-351775

(51) Int. Cl.
*H01M 4/00* (2006.01)

(52) U.S. Cl. .................. 429/218.2; 429/218.1; 429/223

(58) Field of Classification Search ................ 429/128.2
See application file for complete search history.

(56) References Cited

U.S. PATENT DOCUMENTS 5,753,054 A * 5/1998 Tsuji et al. .................... 148/442
2004/0159377 A1* 8/2004 Takamaru et al. ............ 148/513
2004/0219429 A1* 11/2004 Ito et al. ..................... 429/218.2
2006/0286438 A1* 12/2006 Fujikawa et al. ............... 429/61

FOREIGN PATENT DOCUMENTS

JP 9-45322 A 2/1997
JP 2006-173101 6/2009

* cited by examiner

*Primary Examiner* — Keith Walker
*Assistant Examiner* — Wyatt McConnell
(74) *Attorney, Agent, or Firm* — Workman Nydegger

(57) ABSTRACT

A nickel-metal hydride battery that reduces the amount of cobalt and improves battery durability. The battery includes a negative electrode formed from an $AB_5$ hydrogen-absorbing alloy. The alloy includes an A element composed of Misch metal and a B element mainly composed of nickel. The nickel in the B element is partially replaced by at least one further element including cobalt. The alloy is formed to satisfy at least the conditions of a mol ratio of the B element relative to the A element being 5.25 or greater, the amount of cobalt for 1 mol of the A element being 0.15 mol to 0.25 mol, and the alloy having a half-width ratio, which indicates the ratio of a peak half-width of a (002) plane relative to a peak half-width of a (200) plane, of 1.3 to 1.7.

12 Claims, 2 Drawing Sheets

DC-IR (mΩ)
3.2
3.1
3.0
2.9
2.8
2.7
2.6
2.5
VSM Value (wt%)
16
15
14
13
12
11
10
1.50
1.60
1.70
1.80
1.90
2.0
Half-Value Width Ratio

NICKEL-METAL HYDRIDE BATTERY

CROSS-REFERENCE TO RELATED APPLICATIONS

This application is based upon and claims the benefit of priority from the prior Japanese Patent Application No. 2006-351775, filed on Dec. 27, 2006, the entire contents of which are incorporated herein by reference.

BACKGROUND OF THE INVENTION

The present invention relates to a nickel-metal hydride battery, and more particularly, to a nickel-metal hydride battery that uses $AB_5$ hydrogen-absorbing alloy for the negative electrode.

A nickel-metal hydride battery uses a hydrogen-absorbing alloy for the negative electrode instead of cadmium. In comparison with a battery using a cadmium electrode, the nickel-metal hydride battery increases the effective energy density relative to weight and volume. This increases the capacity of the battery, reduces toxicity, and is more environmentally friendly. However, the hydrogen-absorbing alloy used in a nickel-metal hydride battery is apt to corrode when incorporated in a battery since it is immersed in an electrolyte formed from a high-concentration alkaline solution. It is thus required that the hydrogen-absorbing alloy be resistant to alkaline corrosion. Further, the absorption and release of hydrogen during the charging and discharging of the battery causes volumetric expansion and contraction of the hydrogen-absorbing alloy and produces fine powder. This reduces the output and durability of the battery. Accordingly, it is significant that such fine powder of the hydrogen-absorbing alloy be suppressed to prolong the battery life. Especially in applications in which overcharging frequently occurs, lattice expansion of the alloy accelerates the production of fine powder.

An $AB_5$ alloy is most commonly used as the hydrogen-absorbing alloy for a nickel-metal hydride battery. To suppress the production of fine powder, this alloy contains a large amount of cobalt (0.4 mol or more), which is expensive.

In the prior art, Japanese Laid-Open Patent Publication No. 9-45322 discloses a hydrogen-absorbing alloy that suppresses the production of fine powder when used for the negative electrode. The hydrogen-absorbing alloy has a $CaCu_5$ type crystalline structure having a (111) plane with a peak half-width of 0.20 to 0.50 degrees when observed by performing powder X-ray diffraction. Liquid quenching is performed to form flakes or ribbons of the hydrogen-absorbing alloy. X-ray diffraction shows that 60% or more of the crystals in the hydrogen-absorbing alloy have a c-axis oriented in a direction orthogonal to the thicknesswise direction of the alloy.

The manufacturing method of the hydrogen-absorbing alloy proposed in the above publication is inefficient for mass production. Therefore, a large amount of $AB_5$ alloy is manufactured through casting. However, in the $AB_5$ alloy of the prior art, the contained amount of cobalt is substantially at least 0.4 mol, and the theoretical capacity of the negative electrode is at least 1.5 times greater than that of the positive electrode. This increases the usage amount of the hydrogen-absorbing alloy and the expensive cobalt and thereby raises manufacturing cost.

SUMMARY OF THE INVENTION

The present invention provides a nickel-metal hydride battery that reduces the usage amount of cobalt and improves battery durability.

One aspect of the present invention is a nickel-metal hydride battery including a positive electrode and a negative electrode formed from an $AB_5$ hydrogen-absorbing alloy. The $AB_5$ hydrogen-absorbing alloy includes an A element composed of Misch metal and a B element mainly composed of nickel. The nickel is partially replaced by at least one further element including cobalt. The $AB_5$ hydrogen-absorbing alloy is formed to satisfy at least the conditions of a mol ratio of the B element relative to the A element being 5.25 or greater, the amount of cobalt for 1 mol of the A element being 0.15 mol to 0.25 mol, and the $AB_5$ hydrogen-absorbing alloy having a half-width ratio, which is obtained through X-ray diffraction and indicates the ratio of a peak half-width of a (002) plane relative to a peak half-width of a (200) plane, of 1.3 or greater and less than 1.7.

A further aspect of the present invention is a nickel-metal hydride battery including a positive electrode and a negative electrode formed from an $AB_5$ hydrogen-absorbing alloy. The $AB_5$ hydrogen-absorbing alloy includes an A element composed of Misch metal and a B element mainly composed of nickel. The nickel is partially replaced by at least one further element including cobalt. The $AB_5$ hydrogen-absorbing alloy is formed to satisfy at least the conditions of a mol ratio of the B element relative to the A element being 5.25 or greater, the amount of cobalt for 1 mol of the A element being 0.05 mol to 0.15 mol, and the $AB_5$ hydrogen-absorbing alloy having a half-width ratio, which is obtained through X-ray diffraction and indicates the ratio of a peak half-width of a (002) plane relative to a peak half-width of a (200) plane, of 1.1 or greater and less than 1.3.

Another aspect of the present invention is a nickel-metal hydride battery including a positive electrode and a negative electrode formed from an $AB_5$ hydrogen-absorbing alloy. The $AB_5$ hydrogen-absorbing alloy includes an A element composed of Misch metal and a B element mainly composed of nickel. The nickel is partially replaced by at least one further element including cobalt. The $AB_5$ hydrogen-absorbing alloy is formed to satisfy at least the conditions of a mol ratio of the B element relative to the A element being 5.30 or greater, the amount of cobalt for 1 mol of the A element being 0.05 mol to 0.15 mol, and the $AB_5$ hydrogen-absorbing alloy having a half-width ratio, which is obtained through X-ray diffraction and indicates the ratio of a peak half-width of a (002) plane relative to a peak half-width of a (200) plane, of 1.1 or greater and less than 1.9.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
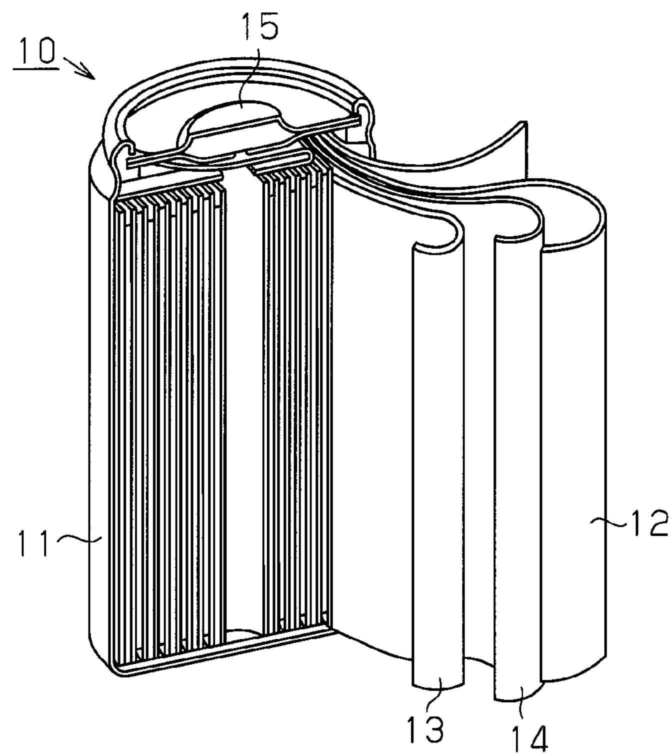
FIG. 1 is a partially cutaway perspective view schematically showing a nickel-metal hydride battery.

In the drawings, like numerals are used for like elements throughout.

A nickel-metal hydride battery 10 according to a preferred embodiment of the present invention will now be discussed.

As shown in FIG. 1, the nickel-metal hydride battery 10 includes a case 11, a positive electrode 12, a negative electrode 13, an electrolyte (not shown), and a lid plate 15. The positive electrode 12, the negative electrode 13, and the separator 14 are wound in spirals and form an electrode plate group. The electrode plate group and the electrolyte are arranged in the case 11, which is sealed by the lid plate 15.

Members that are employed in a typical nickel-metal hydride battery are used as the positive electrode 12 and separator 14. For example, an electrode plate of which main material is nickel hydroxide may be used as the positive electrode 12. Further, a polyolefin non-woven fabric that undergoes a hydrophilic treatment may be used as the separator 14. An alkaline solution of which main solute is potassium hydroxide and specific gravity is approximately 1.3 may be used as the electrolyte.

An electrode plate including a conductive support and a hydrogen-absorbing alloy supported by the support is used as the negative electrode 13. The structure of the hydrogen-absorbing alloy will be described later. A punched metal piece having a nickel-plated surface may be used as the conductive support. A paste containing the hydrogen-absorbing alloy (and a binder when necessary) is applied to the support. Then, the support and alloy are dried, rolled, and cut to form the negative electrode 13. The theoretical capacity of the negative electrode 13 is set to be at most 1.5 times greater than that of the positive electrode 12.

The hydrogen-absorbing alloy powder forming the negative electrode will now be discussed.

The main composition of $AB_5$ hydrogen-absorbing alloy powder is $MmNi_5$, where Mm represents Misch metal. In this case, the A element is the Misch metal. The B element is mainly composed of nickel (Ni) with the nickel being partially replaced by other elements. The B element composed of Ni and other elements is structured to have an atom ratio of 5.25 or greater relative to Mm, or the A element. Misch metal is an alloy of rare earth such as Ka and Ce. The element that replaces Ni may be at least one element selected from a group of, for example, Co, Mn, Al, Fe, Cu, and Ti. Accordingly, the hydrogen-absorbing alloy may be, for example, an alloy containing Mm, Ni, Co, and Al or an alloy containing Mm, Ni, Co, and Al.

The $AB_5$ hydrogen-absorbing alloy satisfies one of the following conditions (1) through (3).

(1) The mol ratio of the B element relative to the A element is 5.25 or greater. The amount of cobalt (Co) for 1 mol of the A element is 0.15 to 0.25 mol. The ratio of the peak half-width of a (002) plane and the peak half-width of a (200) plane is 1.3 or greater and less than 1.7 when observed through X-ray diffraction.

(2) The mol ratio of the B element relative to the A element is 5.25 or greater. The amount of cobalt (Co) for 1 mol of the A element is 0.05 to 0.15 mol. The ratio of the peak half-width of a (002) plane and the peak half-width of a (200) plane is 1.1 or greater and less than 1.3 when observed through X-ray diffraction.

(3) The mol ratio of the B element relative to the A element is 5.30 or greater. The amount of cobalt (Co) for 1 mol of the A element is 0.05 to 0.15 mol. The ratio of the peak half-width of a (002) plane and the peak half-width of a (200) plane is 1.1 or greater and less than 1.9 when observed through X-ray diffraction.

When performing the X-ray diffraction, the diffraction angle 2θ corresponding to the peak of the (002) plane is approximately 44.5°, and the diffraction angle 2° corresponding to the peak of the (200) plane is approximately 41.5°.

The $AB_5$ hydrogen-absorbing alloy is one of a group of alloys having a $CaCu_5$ structure (hexagonal structure), and the ratio of hydrogen atoms and metal atoms (H/M) related to the hydrogen-absorbing amount is substantially 1. In the preferred embodiment, the mol ratio of the B element relative to the A element is greater than 5.0. However, the hydrogen-absorbing alloy has a $CaCu_5$ structure and thus absorbs hydrogen. In the hydrogen-absorbing alloy, the homogeneousness of crystals in the c-axis direction affects the battery durability. The crystal homogeneousness in the c-axis direction is evaluated by performing powder X-ray diffraction and a half-width ratio, which is the ratio of the peak half-width (indicating the crystal homogeneousness in the c-axis direction) of the (002) plane relative to the peak half-width (indicating the crystal homogeneousness in the a-axis direction) of the (200) plane. The crystal homogeneousness in the c-axis direction increases as the half-width ratio decreases. Further, a smaller half-width ratio after 2000 charging and discharging cycles are performed results in further superior internal resistance (DC-IR), which indicates the durability. The half-width ratio differs depending on the mol ratio of the Co contained in the B element and the A element, and the durability varies in accordance with the half-width ratio. When one of conditions (1) to (3) is satisfied, the durability of the nickel-metal hydride battery may be improved with less cobalt than the prior art.

EXAMPLES

Various examples of the present invention will now be described in detail. The nickel-metal hydride battery of each example is formed from a hydrogen-absorbing alloy powder that is manufactured under various conditions.

The manufacturing conditions of the hydrogen-absorbing alloy will now be discussed. The hydrogen-absorbing alloy powder was manufactured in the following manner. First, 45 weight percent of Ce, 30 weight percent of La, 5 weight percent of Nd, and 20 weight percent of rare earth elements were alloyed to form Misch metal (Mm). Then, Mm, Ni, Co, Mn, and Al (i.e., A element and B element) were mixed at a predetermined composition and melted in a depressurized arc furnace. Next, a predetermining heat treatment was performed for a predetermined time at a temperature of 1120° C. in an argon gas atmosphere. The heat-treated metal was cooled to obtain the hydrogen-absorbing alloy. Accordingly, the alloy was prepared by performing casting. A ball mill was used to grind the alloy into alloy powder.

Subsequently, the alloy powder was immersed in an alkaline solution for two hours and agitated. Then, the alloy powder was washed with water and dried.

After adding a polyvinyl alcohol solution having a 5 weight percent concentration, the hydrogen-absorbing alloy powder was kneaded to form a paste. The alloy paste was applied to a punched metal piece, which was then dried, rolled, and cut to form the negative electrode. An active substance paste of which main component was nickel hydroxide was filled in foam nickel, which was then dried, rolled, and cut to form the positive electrode. The positive electrode and negative electrode formed as described above were used to produce a cylindrical nickel-metal hydride battery with a negative electrode having a theoretical capacity that is 1.5 times greater than that of the positive electrode.

Figure 2:
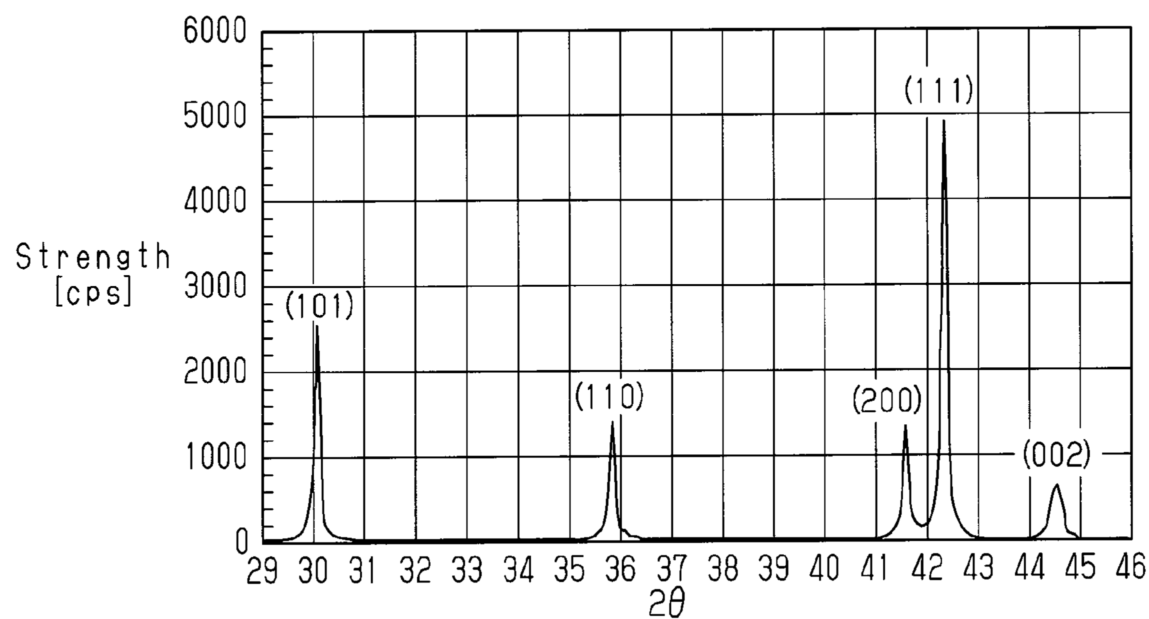
FIG. 2 is a diagram showing a powder X-ray diffraction pattern.

Powder X-ray diffraction was performed on a sample of hydrogen-absorbing alloy powder. As shown in FIG. 2, peaks appeared in diffraction angle 2° corresponding to the (101), (110), (200), (111), and (002) planes. The ratio (half-width ratio) of the peak half-width of the (002) plane that appears in diffraction angle 2θ near 44.5° relative to the peak half-width of the (200) plane that appears in diffraction angle 2θ near 41.5° was obtained.

A method for measuring the internal resistance (DC-IR) relative to direct current will now be described. The battery was charge until the state of charge (SOC) relative to the battery capacity reached 50%. Then, after a ten minute pause, 10 A was discharged for ten seconds. Further, after a one minute pause, 50 A was discharged for ten seconds. Each current value and the voltage measured ten seconds after starting discharging at each current value were plotted to draw a straight line, which was used to calculate the internal resistance (DC-IR).

The durability test that was performed will now be described. The internal resistance (DC-IR) was measured after repeating charging and discharging 2000 times at 10 A in an SOC of 0 to 70%. The internal resistance increases when the charging and discharging of the nickel-metal hydride battery is repeated. It is desirable that the amount of decrease be small. The battery durability is more superior if the internal resistance (DC-IR) is smaller after 2000 cycles.

The measurement of nickel magnetization, or the value obtained by a vibrating sample magnetometer (VSM) will now be described. The saturation magnetization of samples was measured with a vibrating sample magnetometer (VSM-5, manufactured by Toei Industry Co., Ltd.). Under the assumption that all of the magnetic substance in the samples are nickel, the nickel magnetization of the samples was calculated (1 emu/g=0.18384 wt %).

Example 1

Five samples (hydrogen-absorbing alloy powders) 1-1, 1-2, 1-3, 1-4, and 1-5 were manufactured by mixing Mm, Ni, Co, Mn, and Al to obtain a composition of $MmAl_{0.42}Mn_{0.45}Co_{0.2}Ni_{4.18}$ under the manufacturing conditions described above. The time of the heat treatment performed under an argon gas atmosphere at a temperature of 1120° C. varied between samples. The heat treatment time was one hour, four hours, or ten hours. More specifically, the heat treatment time was one hour for sample 1-1, four hours for samples 1-2 and 1-3, and ten hours for samples 1-4 and 1-5. The samples have the same composition. That is, each sample had the same amount of cobalt, which was 0.2 mol, and the same AB mol ratio, which was 5.25. As a comparative example (comparative sample), hydrogen-absorbing alloy powder having a composition of $MmAl_{0.3}Mn_{0.4}Co_{0.75}Ni_{3.55}$ with a cobalt amount of 0.75 mol and an AB mol ratio of 5.0 was manufactured.

Figure 3:
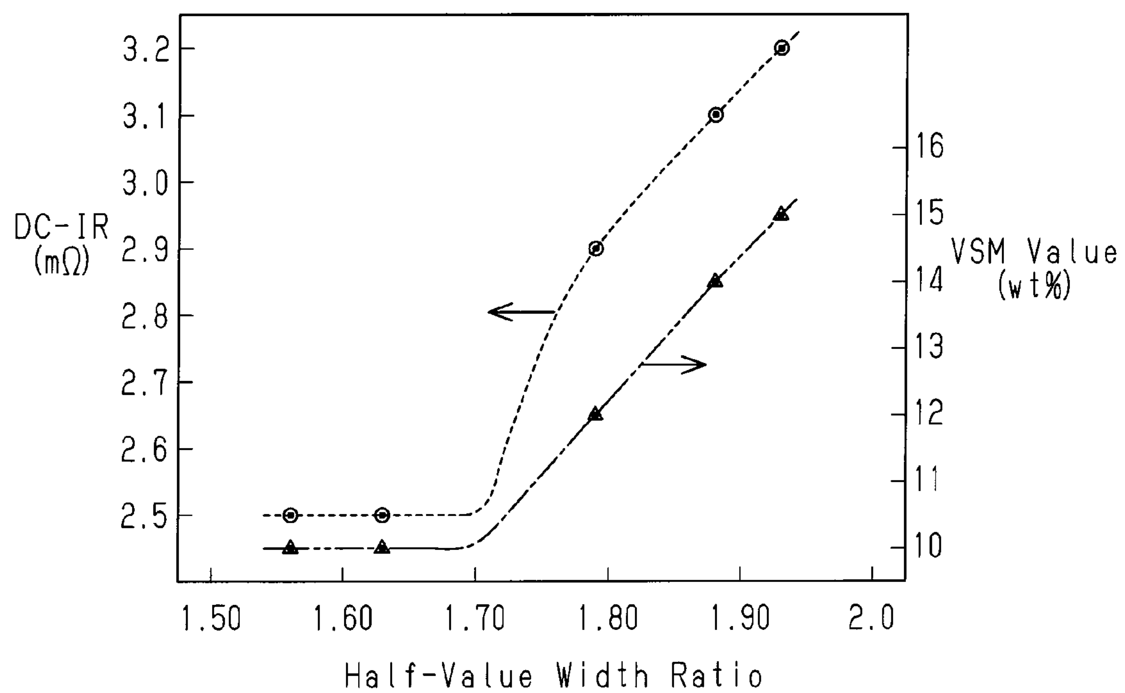
FIG. 3 is a graph showing the relationship between the half-width ratio and durability in example 1.

Powder X-ray diffraction was performed on each sample. Further, nickel-metal hydride batteries were manufactured using negative electrodes formed from the samples. Then, a durability test was conducted on the batteries. More specifically, each battery was charged and discharged 2000 times under the charging and discharging conditions described above. Then, the DC-IR value and VSM value were measured. Table 1 shows the half-width of each sample, and table 2 shows the durability of each sample. FIG. 3 shows the DC-IR value and the VSM value of each sample. Alloy corrosion causes elution or oxidation of elements other than Ni and increases the VSM value. Accordingly, a larger VSM value subsequent to the durability test would indicate that the alloy is susceptible to corrosion, or would have low durability.

TABLE 1

| | Physical Property of Hydrogen-Absorbing Alloy | | | | | | |
|---|---|---|---|---|---|---|---|
| | 101 Plane HW | 110 Plane HW | 200 Plane HW | 111 Plane HW | 002 Plane HW | Lattice Volume | HW Ratio (002)/(200) |
| Comp. Sample | 0.12 | 0.12 | 0.14 | 0.11 | 0.27 | 88.4 | 1.98 |
| Sample 1-1 | 0.12 | 0.11 | 0.11 | 0.11 | 0.22 | 88.3 | 1.93 |
| Sample 1-2 | 0.12 | 0.12 | 0.12 | 0.12 | 0.22 | 88.2 | 1.88 |
| Sample 1-3 | 0.13 | 0.12 | 0.11 | 0.11 | 0.20 | 88.4 | 1.79 |
| Sample 1-4 | 0.12 | 0.11 | 0.11 | 0.11 | 0.18 | 88.4 | 1.63 |
| Sample 1-5 | 0.12 | 0.11 | 0.12 | 0.10 | 0.18 | 88.3 | 1.56 |

*HW half-width

TABLE 2

| | Battery Durability | |
|---|---|---|
| | DC-IR After 2000 Cycles | Alloy Corrosion (VSM Value) After 2000 Cycles |
| Comp. Sample | 2.5 mΩ | 10 wt % |
| Sample 1-1 | 3.2 mΩ | 15 wt % |
| Sample 1-2 | 3.1 mΩ | 14 wt % |
| Sample 1-3 | 2.9 mΩ | 12 wt % |
| Sample 1-4 | 2.5 mΩ | 10 wt % |
| Sample 1-5 | 2.5 mΩ | 10 wt % |

As apparent from table 1, even if the composition is the same, as the heat treatment time becomes longer, the ratio of the peak half-width of the (002) plane and the peak half-width of the (200) plane, that is, the half-width ratio becomes smaller. Further, as apparent from table 1, table 2, and FIG. 3, as the half-width ratio becomes smaller, the DC-IR value after 2000 cycles, or the durability, becomes more superior. Further, samples 1-4 and 1-5, in which the half-width is 1.7 or less, has the same battery durability as the comparative sample, which uses 3.75 times more cobalt than each sample.

Example 2

Seven samples (hydrogen-absorbing alloy powders) 2-1, 2-2, 2-3, 2-4, 2-5, 2-6, and 2-7 were manufactured by mixing Mm, Ni, Co, Mn, and Al to obtain a composition of $MmAl_{0.42}Mn_{0.45}Co_xNi_{4.38-x}$ under the manufacturing conditions described above. The composition of each sample, that is, the cobalt amount, was changed in a range of 0 mol to 0.3 mol. The AB mol ratio of each sample was 5.25. Further, the heat treatment time of the samples was one hour, four hours, ten hours, or twenty-four hours. The heat treatment time was performed under an argon gas atmosphere at a temperature of 1120° C. in the same manner as example 1. As shown in table 3, when the heat treatment time was one hour, the half-width ratio (HW) was greater than or equal to 1.9 ($1.9 \leqq HW$). When the heat treatment time was four hours, the half-width ratio was greater than or equal to 1.7 and less than 1.9 ($1.7 \leqq HW < 1.9$). When the heat treatment time was ten hours, the half-width ratio was greater than or equal to 1.3 and less than 1.7 (1.3≦HW<1.7). When the heat treatment time was twenty-four hours, the half-width ratio was greater than or equal to 1.1 and less than 1.3 (1.1≦HW<1.3). As a comparative example (comparative sample), hydrogen-absorbing alloy powder having a composition of $MmAl_{0.3}Mn_{0.40}Co_{0.75}Ni_{3.55}$ with a cobalt amount of 0.75 mol and an AB mol ratio of 5.0 was manufactured under the same heat treatment conditions as samples 2-1 to 2-7. Then, powder X-ray diffraction was performed on each sample. Further, nickel-metal hydride batteries were manufactured using negative electrodes formed from the samples. Also, a durability test was conducted on the batteries.

TABLE 3

| | Half-Width Ratio (002)/(200) = HW | | | |
|---|---|---|---|---|
| | 1.1 ≦ HW < 1.3 | 1.3 ≦ HW < 1.7 | 1.7 ≦ HW < 1.9 | 1.9 ≦ HW |
| Comp. Sample Co 0.75 mol | After initial activation >2.5 mΩ | After initial activation >2.5 mΩ | 2.3 mΩ | 2.5 mΩ |
| Sample 2-1 Co 0.30 mol | After initial activation >2.5 mΩ | After initial activation >2.5 mΩ | 2.4 mΩ | 2.7 mΩ |
| Sample 2-2 Co 0.25 mol | After initial activation >2.5 mΩ | 2.3 mΩ | 2.5 mΩ | 3.0 mΩ |
| Sample 2-3 Co 0.20 mol | After initial activation >2.5 mΩ | 2.4 mΩ | 3.0 mΩ | 3.2 mΩ |
| Sample 2-4 Co 0.15 mol | 2.3 mΩ | 2.4 mΩ | 3.3 mΩ | 3.5 mΩ |
| Sample 2-5 Co 0.10 mol | 2.3 mΩ | 2.6 mΩ | 3.4 mΩ | 3.8 mΩ |
| Sample 2-6 Co 0.05 mol | 2.5 mΩ | 2.9 mΩ | 3.5 mΩ | 4.2 mΩ |
| Sample 2-7 Co 0 mol | 3.5 mΩ | 4.0 mΩ | 4.6 mΩ | 5.4 mΩ |

The durability of each of the batteries (samples 2-1 to 2-7) was evaluated using a conventional battery (comparative sample) as an evaluation reference. The conventional battery includes more cobalt to prolong the durability. In the durability evaluation, samples having a DC-IR value that is less than or equal to reference value 2.5 mΩ were evaluated as being acceptable. The reference value 2.5 mΩ corresponds to the DC-IR value of the comparative sample that has an AB mol ratio of 5.0 and a half-width ratio of 1.9 or greater after 2000 cycles (upper right portion in table 3). The nickel-metal hydride battery is activated after it is assembled to increase the activity of the hydrogen-absorbing alloy. In the activation stage, when the DC-IR value was greater than 2.5 mΩ, the durability test was cancelled before completing 2000 cycles. When the half-width ratio was 1.1 or greater and less than 1.3 (or 1.3 or greater and less than 1.7), it was difficult to perform activation through normal processing if the hydrogen-absorbing alloy included a relatively large amount of cobalt (n table 3, 0.20 mol, 0.25 mol, and 0.30 mol). Thus, such alloys underwent initial activation. However, the DC-IR value was still higher than 2.5 mΩ after the initial activation, and satisfactory durability could not be obtained.

As apparent from table 3, in example 2, the samples having a half-width ratio of 1.3 or greater and less than 1.7 and a cobalt amount of 0.15 to 0.25 mol had the same durability as samples having a half-width ratio of 1.9 or greater and a cobalt amount of 0.75. Further, it is apparent that samples having a half-width ratio of 1.1 or greater and less than 1.3 and a cobalt amount of 0.05 to 0.15 mol had the same durability as the comparative sample.

Example 3

Five samples (hydrogen-absorbing alloy powders) 3-1, 3-2, 3-3, 3-4, and 3-5 were manufactured by mixing Mm, Ni, Co, Mn, and Al to obtain a composition of $MmAl_{0.42}Mn_{0.45}Co_xNi_{4.43-x}$ under the same manufacturing conditions as example 2. The composition of each sample, that is, the cobalt amount, was changed in a range of 0 mol to 0.20 mol. The AB mol ratio of each sample was 5.30. Powder X-ray diffraction was performed on each sample. Further, nickel-metal hydride batteries were manufactured using negative electrodes formed from the samples. Also, a durability test was conducted on the batteries.

TABLE 4

| | Half-Width Ratio (002)/(200) = HW | | | |
|---|---|---|---|---|
| | 1.1 ≦ HW < 1.3 | 1.3 ≦ HW < 1.7 | 1.7 ≦ HW < 1.9 | 1.9 ≦ HW |
| Sample 3-1 Co 0.2 mol AB Ratio 5.30 | After initial activation >2.5 mΩ | After initial activation >2.5 mΩ | 2.3 mΩ | 2.4 mΩ |
| Sample 3-2 Co 0.15 mol AB Ratio 5.30 | 2.3 mΩ | 2.3 mΩ | 2.4 mΩ | 2.5 mΩ |
| Sample 3-3 Co 0.10 mol AB Ratio 5.30 | 2.3 mΩ | 2.4 mΩ | 2.5 mΩ | 2.8 mΩ |
| Sample 3-4 Co 0.05 mol AB Ratio 5.30 | 2.4 mΩ | 2.5 mΩ | 2.5 mΩ | 3.5 mΩ |
| Sample 3-5 Co 0 mol AB Ratio 5.30 | 3.0 mΩ | 3.4 mΩ | 3.9 mΩ | 4.4 mΩ |

As apparent from table 4, hydrogen-absorbing alloys having an AB mol ratio of 5.30, a half-width ratio of 1.1 or greater and less than 1.9, and a cobalt amount of 0.05 to 0.15 mol had the same durability as the comparative sample having a half-width ratio of 1.9 or greater and a cobalt amount of 0.75 (upper right portion in FIG. 3).

The nickel-metal hydride battery of the preferred embodiment has the advantages described below.

(1) The negative electrode of the nickel-metal hydride battery 10 is formed from an $AB_5$ hydrogen-absorbing alloy. The A element is Misch metal, and the B element is mainly composed of nickel. The nickel is partially replaced by other elements including cobalt. When the mol ratio of the B element relative to the A element is 5.25, the cobalt amount for 1 mol of the A element is 0.15 to 0.25 mol and the half-width ratio obtained through X-ray diffraction is 1.3 or greater and less than 1.7 (condition I), the cobalt amount can be reduced in comparison with the conventional battery. Further, the durability (charging and discharging cycle life) of the nickel-metal hydride battery 10 can be improved.

(2) When the mol ratio of the B element relative to the A element is 5.30, the cobalt amount for 1 mol of the A element is 0.05 to 0.15 mol and the half-width ratio is 1.1 or greater and less than 1.3, the cobalt amount can be reduced in comparison with the conventional battery. In this case, the cobalt amount may be less than that under condition I. Further, the durability (charging and discharging cycle life) of the nickel-metal hydride battery 10 can be improved.

(3) When the mol ratio of the B element relative to the A element is 5.30, the cobalt amount for 1 mol of the A element is 0.05 to 0.15 mol, and the half-width ratio is 1.1 or greater and less than 1.9, the cobalt amount can be reduced in comparison with the conventional battery. In this case, the cobalt amount may be less than that under condition I. Further, the durability (charging and discharging cycle life) of the nickel-metal hydride battery 10 can be improved.

It should be apparent to those skilled in the art that the present invention may be embodied in many other specific forms without departing from the spirit or scope of the invention. Particularly, it should be understood that the present invention may be embodied in the following forms.

The composition of the B element in $AB_5$ hydrogen-absorbing alloy is not limited to that of the preferred embodiment, and the percentages of AL, Mn, Co, and Ni may be varied.

In the $AB_5$ hydrogen-absorbing alloy of the present invention, the A element is composed of Misch metal, and the B element is mainly composed of nickel, with the nickel being partially replaced by other elements including cobalt. The $AB_5$ suppresses the production of fine powder caused by charging and decreases the DC-IR value after 2000 cycles are performed. Accordingly, when the DC-IR value after 2000 cycles is less than or equal to 2.5 mΩ for a certain AB mol ratio, satisfactory durability can be obtained even for an alloy having a higher AB mol ratio. In this case, the upper limit of the AB mol ratio for a meltable B element would be 5.4. Therefore, in the $AB_5$ hydrogen-absorbing alloy of the present invention, when the cobalt amount for 1 mol of the A element is 0.15 to 0.25 mol and the half-width ratio obtained through X-ray diffraction is 1.3 or greater and less than 1.7, the mol ratio of the B element relative to the A element is not limited to 5.25 and may be 5.25 or greater. However, it is preferred that the mol ratio of the B element relative to the A element be 5.4 or less.

In the $AB_5$ hydrogen-absorbing alloy of the present invention, when the cobalt amount for 1 mol of the A element is 0.05 to 0.15 mol and the half-width ratio obtained through X-ray diffraction is 1.1 or greater and less than 1.3, the mol ratio of the B element relative to the A element is not limited to 5.25 and may be 5.25 or greater. However, it is preferred that the mol ratio of the B element relative to the A element be 5.4 or less.

In the $AB_5$ hydrogen-absorbing alloy of the present invention, when the cobalt amount for 1 mol of the A element is 0.05 to 0.15 mol and the half-width ratio obtained through X-ray diffraction is 1.1 or greater and less than 1.9, the mol ratio of the B element relative to the A element is not limited to 5.30 and may be 5.30 or greater. However, it is preferred that the mol ratio of the B element relative to the A element be 5.4 or less.

In the nickel-metal hydride battery of the present invention, the theoretical negative electrode capacity does not have to be at most 1.5 times greater than the theoretical positive electrode capacity and may be greater than 1.5 times. The use of the hydrogen-absorbing alloy of the present invention in the negative electrode enables the cobalt amount to be reduced in comparison with the conventional nickel-metal hydride battery regardless of the theoretical negative electrode capacity. In other words, the nickel-metal hydride battery of the present invention has the same durability as a nickel-metal hydride battery having a negative electrode that uses hydrogen-absorbing alloy containing at least 0.4 mol of cobalt.

The nickel-metal hydride battery is not limited to a sealed nickel-metal hydride battery that includes a cylindrical case and may be a polygonal sealed nickel-metal hydride battery or a battery module formed by combining a plurality of cells.

The present examples and embodiments are to be considered as illustrative and not restrictive, and the invention is not to be limited to the details given herein, but may be modified within the scope and equivalence of the appended claims.

What is claimed is:

1. A nickel-metal hydride battery comprising:

a positive electrode; and a negative electrode formed from an $AB_5$ hydrogen-absorbing alloy including:

an A element composed of Misch metal; and a B element mainly composed of nickel, with the nickel being partially replaced by at least one further element including cobalt;

wherein the $AB_5$ hydrogen-absorbing alloy is formed to satisfy at least the conditions of:

a mol ratio of the B element relative to the A element being 5.25 or greater;

the amount of cobalt for 1 mol of the A element being 0.15 mol to 0.25 mol; and the $AB_5$ hydrogen-absorbing alloy having a half-width ratio, which is obtained through X-ray diffraction and indicates the ratio of a peak half-width of a (002) plane relative to a peak half-width of a (200) plane, of 1.3 or greater and less than 1.7.

2. The nickel-metal hydride battery according to claim 1, wherein the positive electrode and the negative electrode each have a theoretical capacity, and the theoretical capacity of the negative electrode is set to be at most 1.5 times greater than the theoretical capacity of the positive electrode.

3. A nickel-metal hydride battery comprising:

a positive electrode; and a negative electrode formed from an $AB_5$ hydrogen-absorbing alloy, the $AB_5$ hydrogen-absorbing alloy including:

an A element composed of Misch metal; and a B element mainly composed of nickel, with the nickel being partially replaced by at least one further element including cobalt;

wherein the $AB_5$ hydrogen-absorbing alloy is formed to satisfy at least the conditions of:

a mol ratio of the B element relative to the A element being 5.25 or greater;

the amount of cobalt for 1 mol of the A element being 0.05 mol to 0.15 mol; and the $AB_5$ hydrogen-absorbing alloy having a half-width ratio, which is obtained through X-ray diffraction and indicates the ratio of a peak half-width of a (002) plane relative to a peak half-width of a (200) plane, of 1.1 or greater and less than 1.3.

4. The nickel-metal hydride battery according to claim 3, wherein the positive electrode and the negative electrode each have a theoretical capacity, and the theoretical capacity of the negative electrode is set to be at most 1.5 times greater than the theoretical capacity of the positive electrode.

5. A nickel-metal hydride battery comprising:

a positive electrode; and a negative electrode formed from an $AB_5$ hydrogen-absorbing alloy, the $AB_5$ hydrogen-absorbing alloy including:

an A element composed of Misch metal; and a B element mainly composed of nickel, with the nickel being partially replaced by at least one further element including cobalt;

wherein the $AB_5$ hydrogen-absorbing alloy is formed to satisfy at least the conditions of:

a mol ratio of the B element relative to the A element being 5.30 or greater;

the amount of cobalt for 1 mol of the A element being 0.05 mol to 0.15 mol; and the $AB_5$ hydrogen-absorbing alloy having a half-width ratio, which is obtained through X-ray diffraction and indicates the ratio of a peak half-width of a (002) plane relative to a peak half-width of a (200) plane, of 1.1 or greater and less than 1.9.

6. The nickel-metal hydride battery according to claim 5, wherein the positive electrode and the negative electrode each have a theoretical capacity, and the theoretical capacity of the negative electrode is set to be at most 1.5 times greater than the theoretical capacity of the positive electrode.

7. The nickel-metal hydride battery according to claim 1, wherein the Misch metal comprises cerium and lanthanum, wherein the cerium has a concentration that is greater than a concentration of the lanthanum by weight of the Misch metal.

8. The nickel-metal hydride battery according to claim 1, wherein the $AB_5$ hydrogen-absorbing alloy has a durability as high as an $AB_5$ hydrogen-absorbing alloy containing 0.75 mole of cobalt.

9. The nickel-metal hydride battery according to claim 3, wherein the Misch metal comprises cerium and lanthanum, wherein the cerium has a concentration that is greater than a concentration of the lanthanum by weight of the Misch metal.

10. The nickel-metal hydride battery according to claim 3, wherein the $AB_5$ hydrogen-absorbing alloy has a durability as high as an $AB_5$ hydrogen-absorbing alloy containing 0.75 mole of cobalt.

11. The nickel-metal hydride battery according to claim 5, wherein the Misch metal comprises cerium and lanthanum, wherein the cerium has a concentration that is greater than a concentration of the lanthanum by weight of the Misch metal.

12. The nickel-metal hydride battery according to claim 5, wherein the $AB_5$ hydrogen-absorbing alloy has a durability as high as an $AB_5$ hydrogen-absorbing alloy containing 0.75 mole of cobalt.

* * * * *